US007788295B2

(12) United States Patent  (10) Patent No.: US 7,788,295 B2
Wall et al.  (45) Date of Patent: Aug. 31, 2010

(54) COMPUTER METHOD AND APPARATUS FOR PER ASSET TIME-LINE DISPLAY IN ENGINEERING PRODUCT REVISION MANAGEMENT

(75) Inventors: Matthew B. Wall, Cambridge, MA (US); Andrew Aucott, Eaglescliffe (GB)

(73) Assignee: Oculus Technologies Corporation, Boston, MA (US)

( * ) Notice: Subject to any disclaimer, the term of this patent is extended or adjusted under 35 U.S.C. 154(b) by 402 days.

(21) Appl. No.: 11/975,758

(22) Filed: Oct. 22, 2007

(65) Prior Publication Data

US 2009/0083308 A1  Mar. 26, 2009

Related U.S. Application Data

(60) Provisional application No. 60/994,884, filed on Sep. 21, 2007.

(51) Int. Cl.
*G06F 7/00* (2006.01)
*G06F 17/30* (2006.01)

(52) U.S. Cl. .................. 707/804; 707/806; 707/812; 717/170

(58) Field of Classification Search ............ 707/1–10, 707/100–104.1, 20–206; 705/1, 8; 717/101, 717/103, 104, 170, 171, 175, 176
See application file for complete search history.

(56) References Cited

U.S. PATENT DOCUMENTS

2002/0118222 A1* 8/2002 Fogarty ................. 345/741

2008/0034013 A1  2/2008 Cisler et al.

OTHER PUBLICATIONS

Horvath et al., Adaptive objects for behavior based product models, Jan. 10, 2006, IEEE, vol. 1, 651-656.*
Purvis et al., A group collaboration tool for software engineering projects, Aug. 6, 2002, IEEE, 362-369.*
"AccuRev 4.6 Software Configuration Management" Data Sheet, 2 pages. 2008.
"Software Configuration Management—SCM—from AccuRev" 1 page, retrieved from the World Wide Web on Mar. 12, 2008 http://accurev.com/.
"Google SVN Time-Lapse View", 6 pages, retrieved from World Wide Web on Mar. 10, 2008 http://code.google.com/p/svn-time-lapse-view/.

(Continued)

*Primary Examiner*—Jean B Fleurantin
(74) *Attorney, Agent, or Firm*—Hamilton, Brook, Smith & Reynolds, P.C.

(57) ABSTRACT

Computer method and apparatus managing engineering product revisions. A repository holds one or more assets. For each asset, the repository holds respective revisions of the asset. A revision manager tracks changes of state of assets of the repository. Each change of state of a given asset results in a respective revision of the given asset. The revision manager provides a repository per asset timeline view illustrating for a subject asset (i) a timeline sequence of changes of state of the subject asset and (ii) contents of the subject asset. The timeline sequence represents the revision history of the asset. Each of the graphical elements in the timeline sequence implements a handle to the respective revision or state of the subject asset as held in the repository. The invention repository view with timeline sequence enhances users ability to navigate among assets and revisions in the repository.

17 Claims, 6 Drawing Sheets

OTHER PUBLICATIONS

"Jon Aquino's Mental Garden", 5 pages, Oct. 16, 2007; retrieved from the World Wide Web on Mar. 10, 2008 http://jonaquino.blogspot.com/2007/1/sven-time-lapse-view.html.

"IBM Rational ClearCase" 4 pages, Mar. 2007 http://ibm.com/software/rational/offerings/scm.html.

"Rational ClearCase", 2 pages, retrieved from the World Wide Web on Mar. 12, 2008 http://www-306.ibm.com/software/awdtools/clearcase/.

"SmartSVN—Subversion/SVN Client: Highlights", 4 pages, retrieved from the World Wide Web on Mar. 11, 2008 http://www.syntevo.com/smartsvn/features.html.

"SmartSVN—the Easy-to-use Subversion Client" *SyntEvo GmbH.*, 2 pages, 2005-2007 http://syntevo.com.

"The Coolest Interface to (Sub)Version Control" 4 pages, retrieved from the World Wide Web Mar. 12, 2008 http://tortoisesvn.net/.

"ViewVC: Repository Browsing", 2 pages, retrieved from World Wide Web on Mar. 12, 2008 http://viewvc.org/.

* cited by examiner

COMPUTER METHOD AND APPARATUS FOR PER ASSET TIME-LINE DISPLAY IN ENGINEERING PRODUCT REVISION MANAGEMENT

RELATED APPLICATION

This application claims the benefit of U.S. Provisional Application No. 60/994,884, filed on Sep. 21, 2007, the entire teachings of which are herein incorporated by reference.

BACKGROUND OF THE INVENTION

Engineering is often a collaborative effort. For example, a software development project requires a team of designers, developers, testers, and management. Other engineering projects have similar teams of project members. Tools for supporting and managing the team include integrated development environments for individual activities as well as collaborative tools for communicating about and/or sharing data.

Attempts have been made to codify and/or standardize engineering processes. Examples in software development include the Unified Modeling Language (UML) and other visual modeling languages. Such visual modeling languages have formal syntax and symantics for communicating a model or conceptualization. In general, at the modeling level a "problem" is posed in terms of a customer's needs and requirements and may be referred to as the business problem system. The software designer develops a "solution" software product and/or services that address the problem. The visual modeling language syntax enables software designers to express (specify and document) the subject problems and solutions in a standardized manner, while the symantics enable knowledge about the subject problem system to be captured and leveraged during the problem solving phase. As such, the visual modeling language enables the sharing of information (including prior solution portions) and extension (without reimplementation) of core object oriented concepts (analysis and design) during the iterative problem-solving process for designing software products.

Attempts have been made to formalize the capture of artifacts used to create engineered products, whether the products are electromechanical systems or software applications. In many engineering environments, these systems are referred to as product data management (PDM) systems. In software development, these are often referred to as revision (or version) management systems. Typically these systems serve as a vault or storage system that captures changes to a product design over time.

Most revision management systems include the notions of a repository and a working copy. The repository is the vault in which all changes are recorded. The working copy is a snapshot of a specific state in time, copied to a work space in which an engineer can work on it. Typically a working (workspace) copy of a file (or asset in general) from the storage is shown with changes relative to the repository (stored) copy but not vice versa. "TortoiseSVN", an open source engineering tool, is an example.

SUMMARY OF THE INVENTION

The present invention addresses the disadvantages and concerns of the prior art. In particular the present invention provides a revision manager that produces and displays a per asset timeline (changes of a particular asset over time). The per asset timeline shows the revision history or a time sequence of the changes of state of a subject asset. The contents of the asset at each state are viewed in a screen view with the per asset timeline.

Preferably, a visual grammar is employed in the screen view display of the per asset timeline where elements may be color coded and have different respective geometric shapes or symbols.

In one embodiment, the revision manager tracks changes of state made to assets held in a repository. For each change in state of a given asset, there is a respective resulting revision (version) of the given asset. The revision manager provides a repository view illustrating the per asset timeline. The revision manager renders the per asset timeline in at least two user selectable modes, namely show all mode and location only mode. In show all mode, each of the changes (across "all" time) made to the asset is shown. In location only mode, only changes made to the asset through the time of the viewed location of the repository 12 are shown.

Further the per asset timeline view includes a head indicator for indicating the current asset state. The head indicator is a handle (i.e., link or hyperlink) to the working copy and current contents of the asset. Accordingly from the per asset timeline of the repository view, one is able to access the contents of the asset at different states in the history of changes to the asset as heretofore unachieved by the prior art. Thus, the present invention repository view per asset timeline assists user navigation to assets and revisions in the repository.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
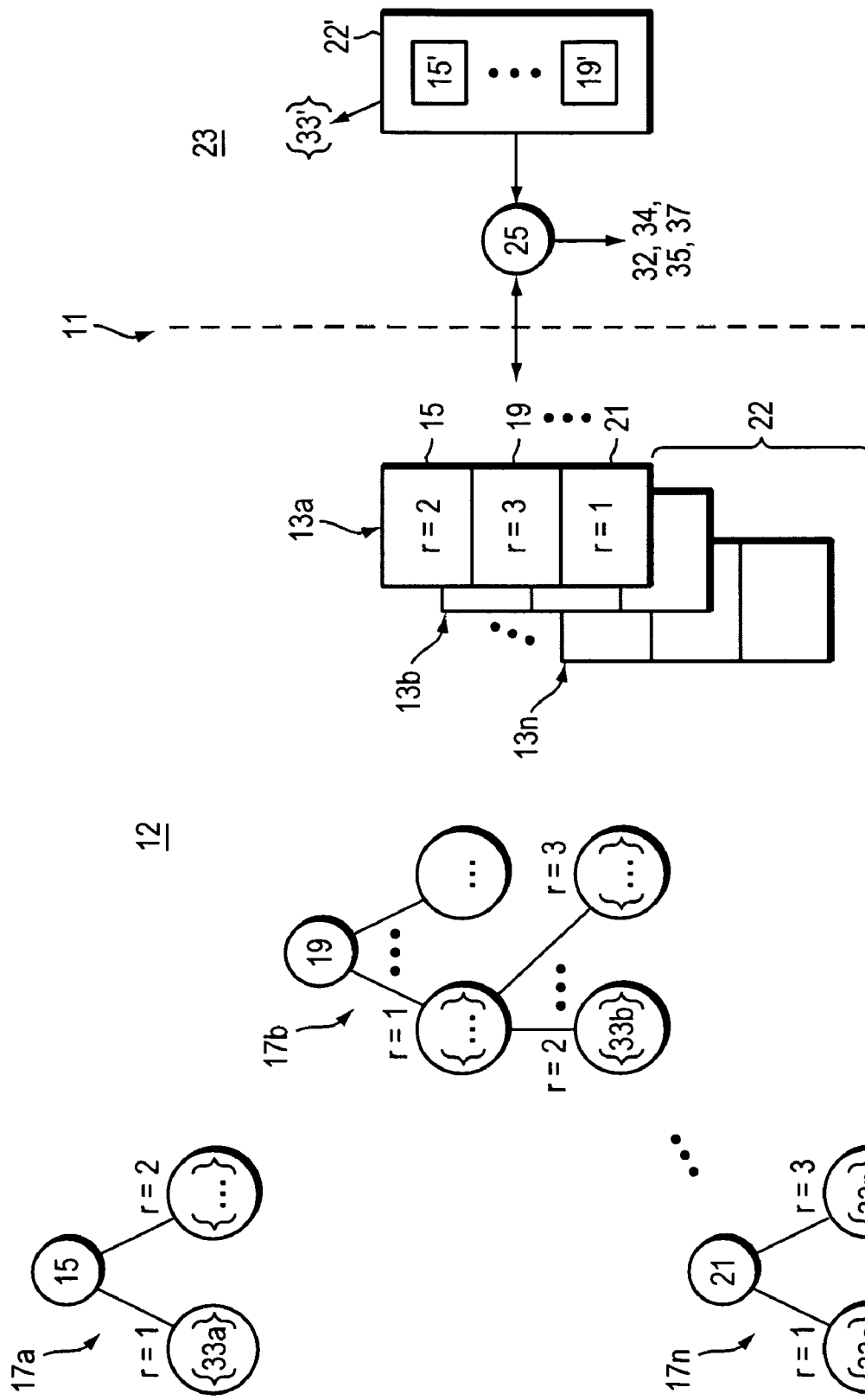
FIG. 1 is a schematic view of an engineering product revision management system of the present invention.

Illustrated in FIG. 1 is an engineering product management system 11 embodying the present invention. One example is a software configuration management system but management systems of other engineering products are suitable. Engineering Product management system 11 provides a work space 23 view of a set of assets (generally engineered product) 13. This engineered product 13 is formed of one or more assets 15, 19, 21. Each asset 15, 19, 21 has respective versions or revisions, typically referenced by a revision number. Different sets 22 of assets forming the different versions 13a, b.

... n of the engineered product 13 employ respective revisions of the assets 15, 19, 21. One of the illustrated versions (sets of assets 22) of engineered product referenced 13a in FIG. 1 is formed of revision r=2 of asset 15, revision r=3 of asset 19 and revision r=1 of asset 21. Other versions 22 of subject engineered product 13 use other revisions of assets 15, 19, 21.

Each version (set of assets) 22 of an engineered product 13 has a state. For a given state, every asset 15, 19, 21 in the set 22 has a location in space (repository 12 further described below) and in time defining the state. Representation of asset location in memory follows the format:

---
Protocol://[[username [:pw]@] host [:port]]/dir ... /asset [@r]
Where "Protocol" is for example http:
   https:
   svntssn:
   svn:
   or ftp:
Username [:pw] is an enduser login or system name and password,
host [:port] is a local or remote server name and port number,
/dir (first occurrence) is the root and parent (i.e., uppermost level directory) name, and
/asset [@ r] is the name of the subject asset and revision number r.

---

Each asset 15, 19, 21 has a set of revision numbers r. Each revision number designates a specific state of the asset within the repository 12.

Common examples of assets are files and directories containing diagrams or drawings, engineering specifications, source code of a software program, requirements documentation, system models, system tests and so forth. A significant state of an asset is saved as a revision of that asset, and the sets of revisions (states) of a given asset are stored in a tree or similar searchable data structure 17. Asset revision trees 17 and assets 15, 19, 21 are held in a repository 12 illustrated to the left side of the dashed lines in FIG. 1. Thus, FIG. 1 illustrates an asset revision tree 17a for asset 15, asset revision tree 17b for asset 19 and asset revision tree 17n for asset 21.

When an engineer or collaboration team member makes changes to an asset 15, 19, 21, the set of changes 33 is recorded in respective asset revision tree 17. In particular, a change set 33 lists the modifications made to respective assets in one state to arrive at the next immediate state of the assets. A change set 33 may be as short as a listing of changes (one or more) made to one file (asset) or as expansive as respective listings of changes made to many assets. The asset revision trees 17 are maintained in this way for each version 22 of engineered product 13a, b, c.

Specifically, engineered product management system 11 enables users to produce and work with (edit, test, redesign, etc.) different configurations or versions 22 of subject engineered product 13. The engineering product management system 11 utilizes a revision manager 25 to manage the revisions made to each asset 15, 19, 21 and the resulting revised assets thereof. Changes to assets 15, 19, 21 are made in the context of workspace 23. The workspace 23 identifies the local changes (change set 33') currently being performed to a version 22' of engineered product 13 (its assets 15' and 19' for example) of that workspace. When the local changes 33' are completed and accepted or otherwise saved by the users, the revision manager 25 records in respective asset revision trees 17 the resulting new revised asset or asset revisions and the corresponding changes (change sets) 33a, b, ... n.

In a preferred embodiment, the revision manager 25 operates as a tracking tool tracking changes 33, 33' for assets 15, 19, 21 and hence tracking changes of state and corresponding resulting revisions/versions of assets. As such, the revision manager 25 is able to provide (produce) various screen views that are helpful to end users or project team members working on sets of artifacts/assets 15, 19, 21. In one embodiment, there are four particular views generated by the revision manager 25, namely a working copy view 32, a file history view 34, a project view 35 and a repository (or per asset timeline) view 37.

With the working copy view 32, the revision manager 25 enables a user to view status information of an asset 15, 19, 21. For the subject asset, there is a working copy and a repository copy. The revision manager 25 establishes the working copy 15', 19' upon the user checking out the asset 15, 19, 21 from the repository 12 and placing the asset (a working copy 15', 19' thereof) in user workspace 23 on a local drive for example. In the working copy view 32, the revision manager shows the asset working copy 15', 19' relative to the corresponding repository copy 15, 19 and vice versa. This is accomplished using the cache or other stored collection of changes 33' to the working (i.e., workspace 23) copy 15', 19' and the changes 33 associated with the repository copy 15, 19. In a preferred embodiment, the revision manager 25 provides real time display of changes 33, 33' in both of these directions, i.e., relative to working copy and relative to repository copy.

Further, repository manager 25 provides a file history view 34 showing the log of change messages 33 for a single asset. Version history tables 17 support this view 34. Additional details of one embodiment of the file history view 34 and working copy view 32 are disclosed in U.S. Provisional Patent Application No. 60/994,720 filed Sep. 21, 2007 for "Computer Method and Apparatus for Software Revision Management", incorporated herein by reference. The project view 35 is detailed in U.S. Provisional Application No. 60/994,884 filed Sep. 21, 2007 by assignee, also herein incorporated by reference. More germane to the present invention is the repository view 37 with per asset timeline discussed next.

By way of background, in prior art engineering product management systems, branches (hierarchies) of assets are typically shown as vertices. In contrast, engineering product management systems of the present invention provide project view 35 (FIG. 2) which uses lines to indicate branches and subbranches of assets and further illustrates relationships of the branches to a trunk as heretofore unavailed by the prior art. The illustrated relationships represent dependencies between assets and branches/subbranches comprising the assets.

In addition, the prior art systems do not illustrate asset state changes or a time order of asset revisions. Further, illustrations in the prior art systems are typically only on a per asset basis, not whole sets of assets as needed/wanted in team projects and complex software configurations. In stark contrast, the project view 35 and repository view 37 of the present invention enable users to see asset state changes and a time view of asset revisions for whole sets of assets.

Further in shared file systems, file servers provide to users only a way to look at contents (files) in space. In a repository system, such as repository 12, one is concerned about space and time aspects of assets. So there exists a need to show a timeline of asset changes 33 and the corresponding resulting revisions (versions). In a single network diagram, revision manager 25 of the present invention displays both a timeline view of assets and changes 33 to state of an asset. This graphical display of the history of changes 33 to sets of assets in engineering product management system 11 is called the project view 35. A graphical display of the history of changes to individual assets is called the repository or per asset timeline view 37. The repository (per asset timeline) view 37 is discussed next with reference to FIG. 2 and FIG. 5.

By way of overview, the project view 35 (FIG. 2) displays a trunk 26, branches 29a . . . n, state changes 30a . . . n of assets and tags 27a . . . n involved in an engineering product project along with various graphic indicators 28, 36, 39, 40. There are numerous configurations that each of these elements can assume. For each user (project member) there is a respective branch 29 and corresponding subbranches 29h. Each of these branches 29/subbranches 29h are shown below trunk 26 in a manner illustrating their relationship to trunk 26. Each change of state of an asset is rendered as a grey dot 30 along a pertinent branch (of a respective user). Each grey dot 30 coupled with a respective tag 27 represents a point at which the resulting revision/version of an asset is committed and available for use by users. The project view 35 has two scaling modes: temporal and sequential. In sequential mode, left to right increments correspond to changes in state and thus sequence of revisions. This is illustrated in some embodiments by grid lines aligning with commit points 30. In temporal mode, the left to right increments correspond to steps in time, thus the grid lines do not often align with commit points 30 in that viewing. Both modes show both types of changes (i.e., sequential changes to state and order of changes over time).

Figure 2:
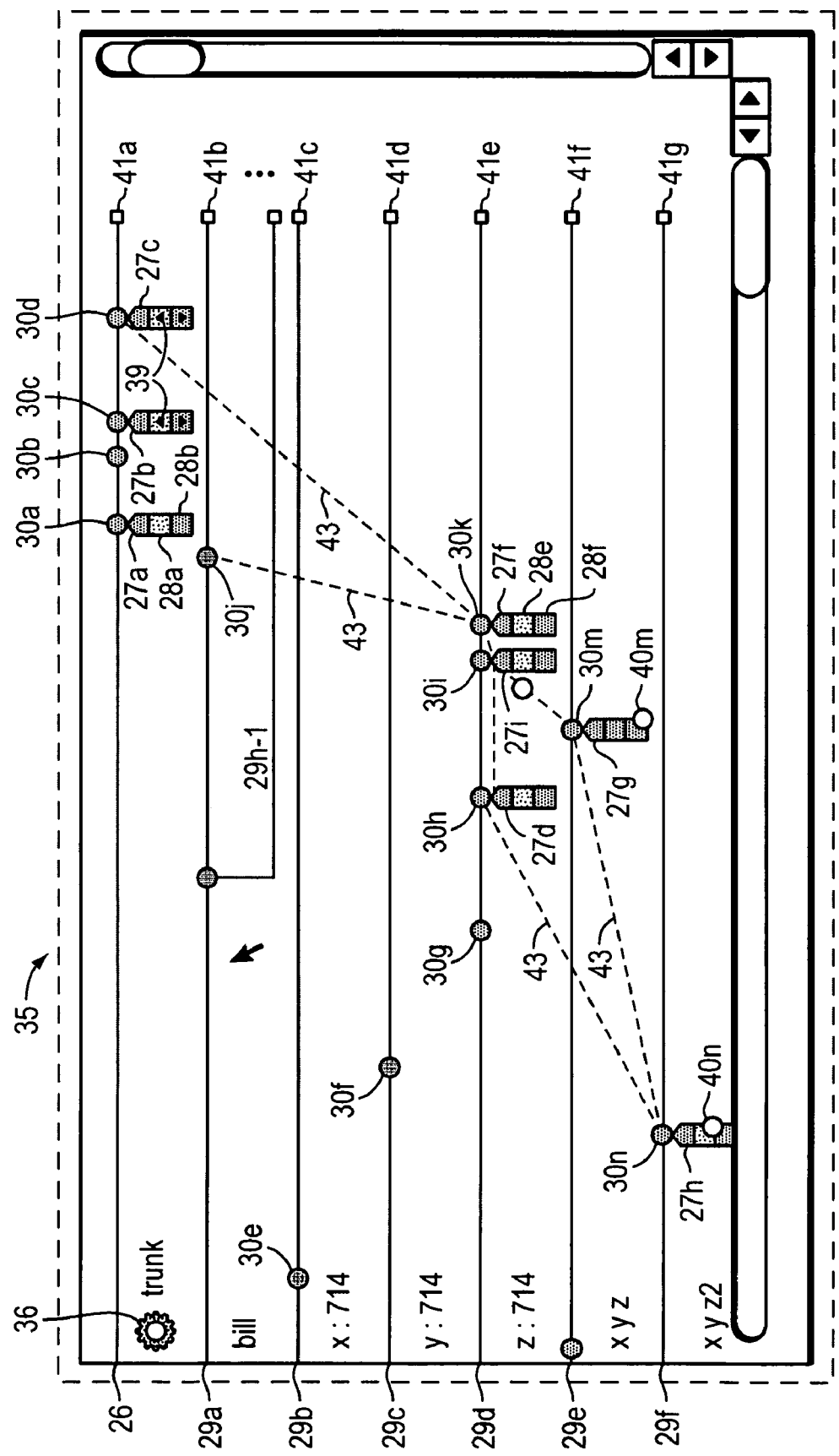
FIG. 2 is a schematic view of a project screen view in the system of FIG. 1.

As illustrated in FIG. 2, there is a respective horizontal line, (branch 29 and associated/related subbranches 29h) per user indicating a hierarchy of assets being worked on by the user. There may be a subbranch 29h for each variation or concept by the user. Each branch/subbranch 29 may be labeled to indicate the respective user.

At the top of project view 35 is the trunk line 26. The spatial layout of the branches 29 relative to trunk 26 illustrate the dependencies between branches 29/subbranches 29h and assets/versions of those branches 29. A copy of an asset is indicated by a dashed line copy path 43 from the starting or source asset. The system assigns the copy asset the same name as the source asset in preferred embodiments. Trunk 26 and each branch 29 are said to contain the respective hierarchy of assets. Each trunk/branch line 29 is a handle to the asset hierarchy as stored in repository 12. This handle is implemented using a hyperlink or similar technology. Preferably the trunk line 26 is a link (hyperlink) to the file directories of the asset hierarchy and is thus the "root" for the displayed project.

As mentioned above, in one embodiment, the project view 35 employs grey dots (filled circles) 30 to indicate state changes of assets, and a tag 27 coupled to a grey dot 30 to indicate when a change of state is sufficiently committed to for other users purposes. Preferably tags 27 are graphically represented by a pentagon shaped symbol. Other geometric shapes (polygons) or symbols are suitable for representing tags 27. Once created, tags 27 are typically read-only in some embodiments.

Each of the so called commit points 30 represents a change of state to one or more assets at that point in time. The enumeration of changes is called a change set 33. In a preferred embodiment, the change set is implemented as a list 33. The list of changes 33 is recorded for or at a specific version of an asset in repository 12 as illustrated in FIG. 1. The list contains the path of each item that was modified (e.g., svn+ssh://host/repo/dir/file.txt) as well as an indication of what kind of change was made (e.g., added, removed, modified). This list of changes 33 is commonly known as a change set, but is also referred to as changed paths.

In one embodiment, user selection (through a graphical user interface) of a commit point 30 operates to generate a query of the repository 12 for change sets 33 of the asset corresponding to the selected commit point 30. The repository 12 responds to the query and returns a corresponding file storing the change sets 33 of the asset. Database and similar techniques are used to implement this.

The latest state of an asset or set of assets is represented by a head element 41. In a preferred embodiment, head 41 is implemented as a block (square) at the distal end of each trunk 26/branch 29 and is a handle for the head of that trunk 26/branch 29. The handle may be implemented using hyperlink or similar technology. Thus, selecting this handle is equivalent to requesting "the latest stuff" (includes workspace 23 changes 33'), which is not necessarily the same as requesting "the latest revision/version" committed to repository 12 where a revision/version is a specific state in the repository 12 as discussed above.

Each tag 27 may have one or more performance indicators 28 associated with it. Restated a performance rating may be associated with each change in state (revision) of an asset. The respective performance indicator 28 represents the performance rating. In one embodiment, each performance indicator 28 is represented by a block (square), each block being a single metric. Each metric may have one or more asset groups associated with it. The colors of the performance indicator 28 blocks correspond to the metric score. In that sense, the performance indicators are color coded in some embodiments. Arrows 39 (FIG. 2) in the performance indictor 28 block indicate whether the metric score has gone up or down since the previous tag 27 with that metric. Grey blocks in the performance indicator 28 blocks indicate a change to the preference curves used to generate the metric score.

Various performance metrics and performance calculations known in the art are suitable. Preferably a separate program procedure or function determines performance per asset revision (state change) and stores respective performance metric scores of asset revisions in repository 12.

Preferably revision manager 25 also provides in project view 35 indications 40 of annotations or comments by a user. The annotations may regard the performance score, performance metric used, change in performance score calculation parameters or factors and the like of performance indicators 28 and metric change indicators 39. The annotations may regard the corresponding asset/commit points 30 state of changes, copy path 43, dependencies and so forth. Upon a user interacting with an annotation indicator 40 according to the graphical user interface of project view 35, revision manager 25 displays or otherwise renders the text of the corresponding annotations and/or comments. Annotation or comment technology known in the art supports operation of annotation indicators 40.

In order to indicate the existence of a working copy 15', 19' of an asset or set of assets, project view 35 displays a working copy indicator 36. In a preferred embodiment, working copy indicator 36 is displayed next to the branch name from which the subject asset(s) were obtained (sourced). If there is more than one working copy 15', 19' of a subject asset/set of assets, then project view 35 displays a respective working copy indicator 36 for each working copy. For example, two working copy indicators 36 next to one (a same) branch name indicates that there exists two working copies 15', 19' of the same asset or set of assets.

Each working copy indicator 36 is a handle to the respective working copy 15', 19' in the user's workspace 23. The handle may be implemented using hyperlink or similar technology. The working copy indicator 36 provides a link to the working copy or a link to status information about the differences between a working copy 15', 19' and the trunk 26/branch 29/tag 27 from which it was checked out.

Figure 5:
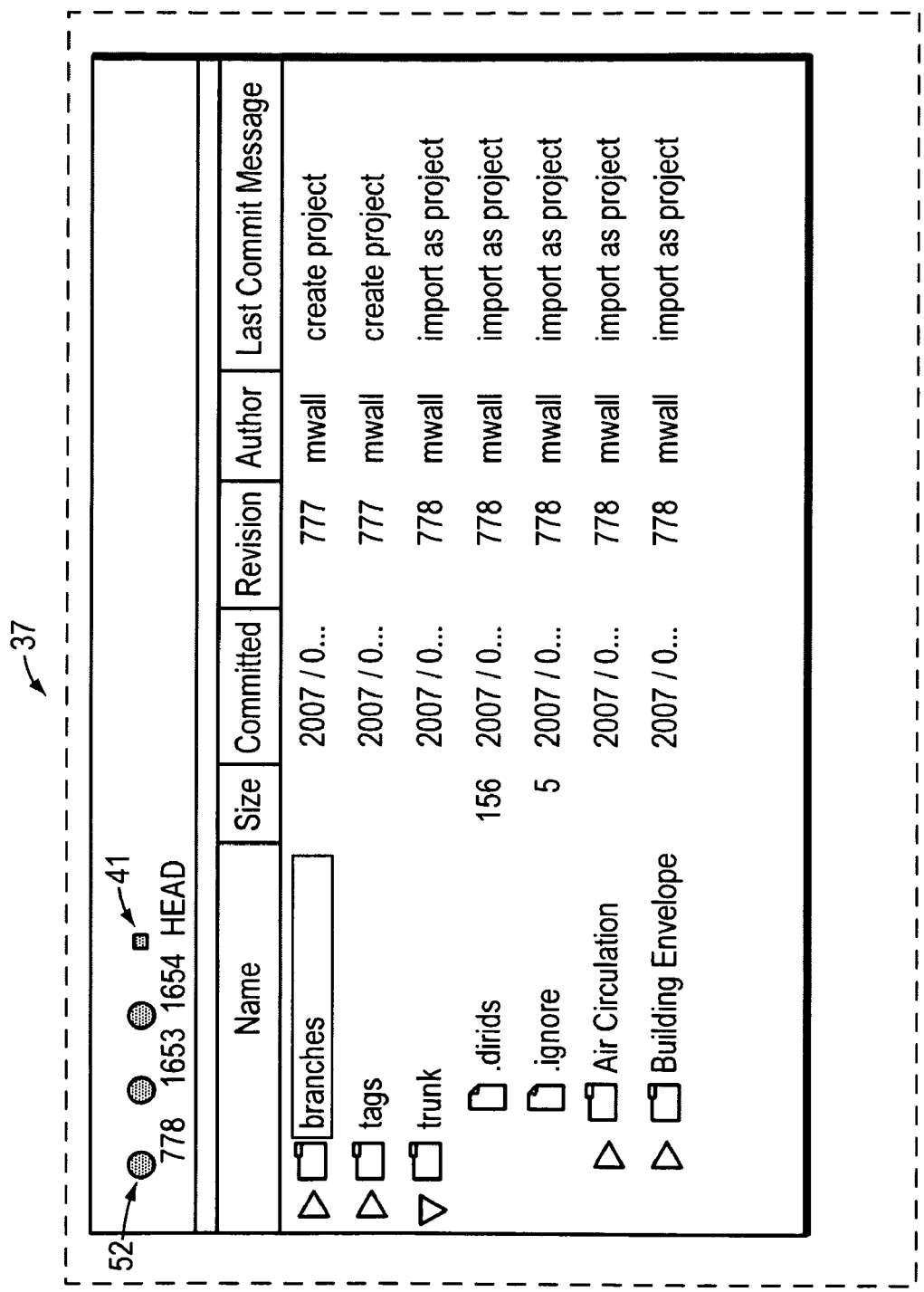
FIG. 5 is a schematic view of a repository screen view of the present invention showing a per asset timeline.

Turning to FIG. 5, the repository or per asset timeline view 37 displays for a single asset, the asset's revision history and asset contents. In one embodiment, the revision history 52 is represented by a series of dots in a row or horizontal line. Each dot represents a change of state to the asset (a revision), and the dots are ordered oldest past revision to newest (reading left to right in the series). A revision number may be indicated with the respective dot/revision. At the right hand end of the series of dots, the head element 41 of the asset (or a set of assets in a project) is displayed and represents the current (or work) revision to the subject asset.

Using hyperlinks or other link technology and asset memory location in repository 12 (described above), each of the displayed dots at 52 and the head element 41 are handles to different states (revisions) of the subject asset as held in repository 12. In this way, the invention repository view 37 enables and assists user navigation of repository 12.

There are two types of assets: containers and non-containers. Files are examples of non-container assets, for example, a spread sheet or a text document. Directories are examples of container assets. If an asset is a container, then the dots at 52 in the per asset view 37 represent sets of changes. This is similar to the branches 29/subbranches 29h and commit points 30 in project view 35 where each branch 29 is effectively a directory. If the asset is a non-container asset, then the dots at 52 in repository view 37 represent a single change to the asset.

In the main body of repository/per asset view 37 is displayed a hierarchy of asset contents. Icons, descriptors and other information (e.g., revision author name, commit date/time, revision number, size, etc.) is provided. The information is arranged in a manner illustrating the flow of asset evolution (state change or revision).

Figure 6:
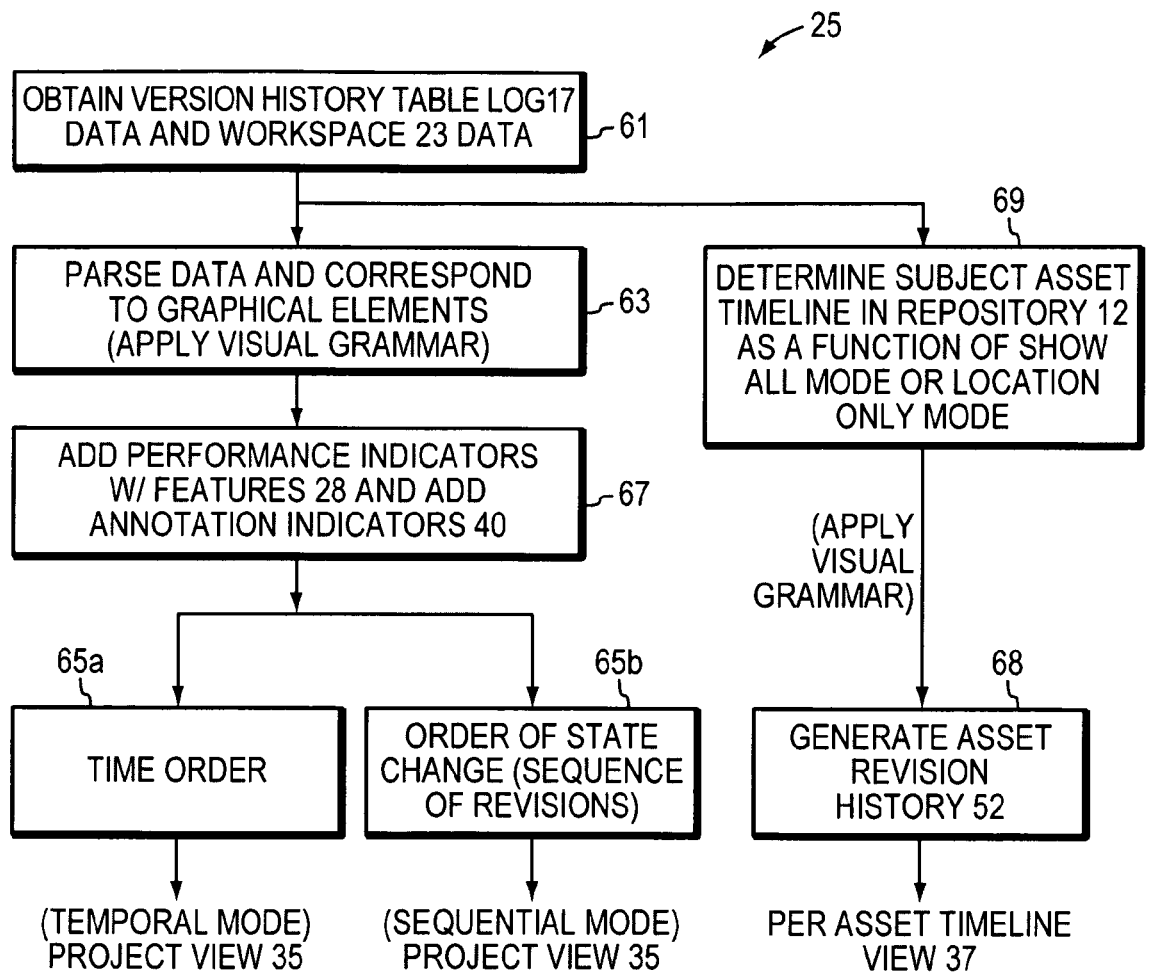
FIG. 6 is a flow diagram of a revision manager according to the present invention, in the configuration management system of FIG. 1.

In some embodiments, the revision manager 25 creates the project view 35 and repository view 37 as follows and illustrated in FIG. 6. The revision manager 25 starts with the data stored in version history tables 17 and the workspace 23 data of project users (step 61). In particular, revision manager 25 queries the repository 12 for logs 17 within a pertinent time period, and then queries the repository/logs based on asset names (to deduce copy paths 43 for example) or other revision aspects. The revision manager 25 then parses the data (step 63) and corresponds the resulting parsed pieces to respective graphical elements (head 41, branch 29, subbranch 29h, tag 27, commit point 30, asset working copy 15', 19' and corresponding working copy indicators 36, etc.). Logic for deducing view elements from the history log data and workspace 23 data may also be employed using common techniques. Preferably revision manager 25 applies color coding and a visual grammar (detailed later) to make these correspondences at step 63.

Revision manager 25 at step 67 adds performance indicators 28 and arrows 39 according to performance metric scores and performance rating information stored in repository 12. Step 67 also adds annotation indicators 40. Revision manager 25 at step 67 also generates and places links (hyperlinks) for each pertinent element linking trunk 26, branches 29, commit points 30, tags 27 and/or performance indicators 28 of an asset to the respective repository copy of the asset/revision and linking branch heads 41 and working copy indicators 36 of an asset to the respective workspace 23 copy of the asset.

The revision manager 25 orders (step 65a, b) the determined graphical elements by time (for temporal mode of the project view 35) and/or by state i.e. sequence revision (for sequential mode of the project view 35).

For a given location in repository 12, there is one and only one asset timeline for supporting per asset timeline view 37. Each respective asset timeline may be rendered in one of two user selectable modes: show all and location only. In show all mode, every revision (version) is shown for the asset even if the revision/version happened to the asset at a point in the history/sequence of revisions after the viewed location. In location only mode, the timeline is limited to revisions/versions made when the asset was in the viewed location of the repository 12. Revision manager 25 utilizes version history tables/logs 17 to determine these asset timelines (step 69 FIG. 6) and to generate per asset timeline view 37 (i.e., asset revision history 52, step 68 FIG. 6). Revision manager 25 utilizes workspace 23 data to provide the current asset contents and head element 41 in per asset timeline view 37. Similar to step 67, revision manager at step 68 sets links/hyperlinks and the like for the asset revision and head 41 elements in revision history 52 (linking to respective repository 12 copy and workspace 23 working copy of the subject asset).

Accordingly throughout the project view 35 and repository view 37, the present invention employs a visual grammar, i.e., an enumeration of the different branch 29/subbranch 29h and tag 27 states and how the configuration manager 11/revision manager 25 will render them. The revision manger 25 is not the only subversion client, so there are a number of cases where the revision manager 25 must be able to display a repository 12 state even if the revision manager is not designed to put the repository 12 into that state. The visual grammar of the preferred embodiment is detailed in Appendix I.

Each case enumerated in Appendix I includes a brief description of the state, an image of what this state looks like graphically and svn command line examples of how the repository 12 can be put into the state for that case. In addition, each case may include SVN Log entries that correspond to the state.

Further, it is noted that each view 32, 34, 35, 37 (i.e., working copy view 32, file history view 34, project view 35 and repository/per asset timeline view 37) has a network memory location. The location is specified as a URL that uniquely locates an asset and uses the form

URL@NNN where the "URL" is the asset location in space and the "@NNN" is the asset location in time. The "@NNN" specifies at revision number NNN as common in the industry. Thus, the present invention views (i.e., working copy view 32, file history view 34, project view 35 and repository/per asset timeline view 37) provide a view into the repository 12 in both time and space, where in one embodiment the grey dots (at 52 in FIG. 5 and 30 in FIG. 2) represent past revisions/versions of an asset and the unfilled rectangle heads 41 represent the current (workspace 23) asset revision contents. In the prior art, only a view into the file server in space was provided and not a view in time and space as in the present invention.

Figure 3:
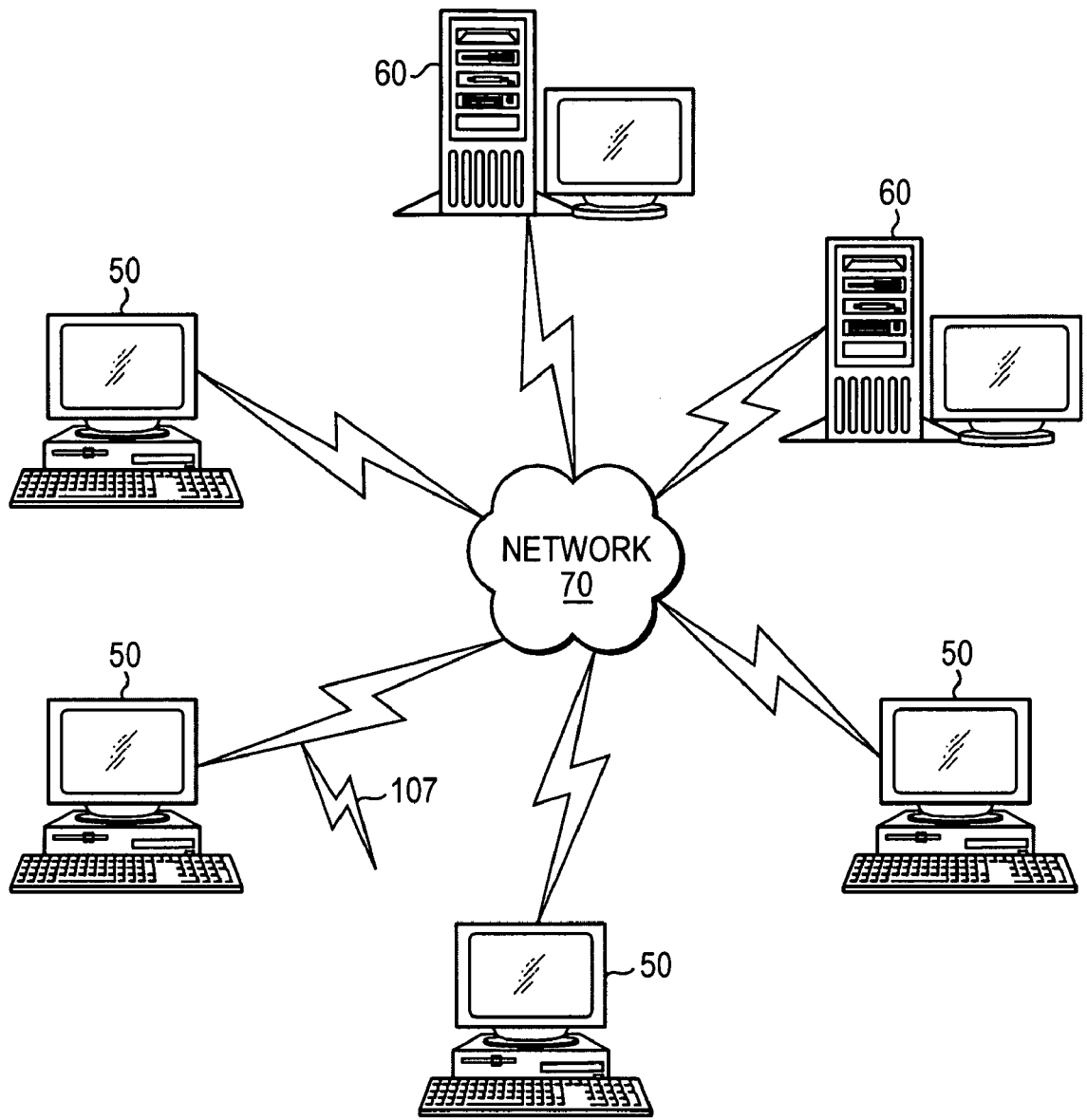
FIG. 3 is a schematic view of a computer network environment in which embodiments of the present invention are implemented.

FIG. 3 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 4:
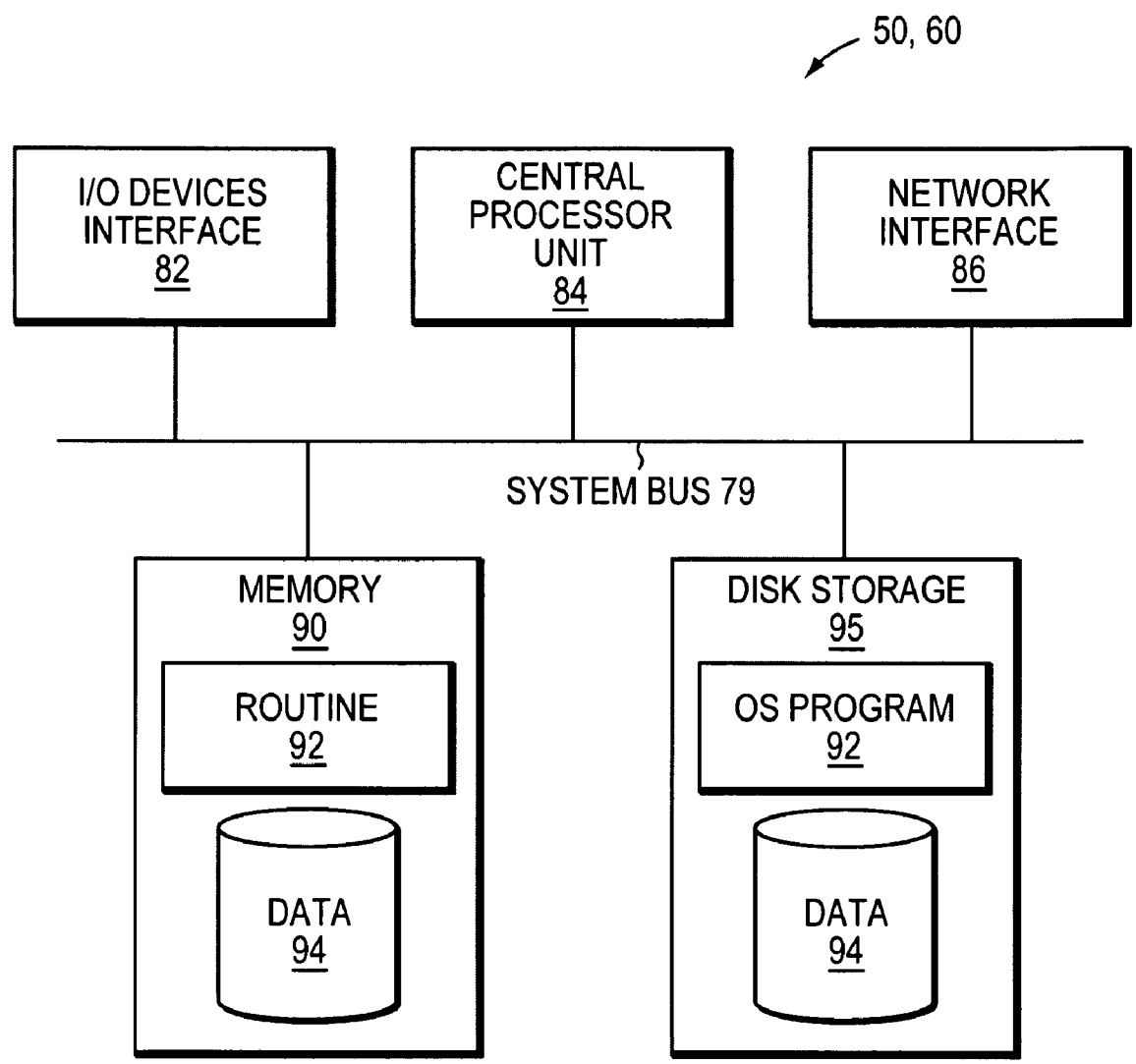
FIG. 4 is a block diagram of a node in the computer network of FIG. 3.

FIG. 4 is a diagram of the internal structure of a computer (e.g., client processor/device 50 or server computers 60) in the computer system of FIG. 3. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 3). Memory 90 provides volatile storage for computer software instructions 92 and data 94 used to implement an embodiment of the present invention (e.g., revision manager 25, and code for generating project view 35 and repository or per asset timeline screen view 37 with asset revision history 52 detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network (s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to preferred embodiments thereof, it will be understood by those skilled in the art that various changes in form and details may be made therein without departing from the scope of the invention encompassed by the appended claims.

For example, the present invention may be implemented in a variety of computer architectures. The computer network of FIGS. 3 and 4 are for purposes of illustration and not limitation of the present invention.

APPENDIX I

Visual Grammar

This is an enumeration of the different branch and tag states and how the application will render them. The revision manager is not the only subversion client, so there are a number of cases where the revision manager must be able to display a repository state even if the revision manager is not designed to put the repository into that state. Each case enumerated below includes a brief description of the state, an image of what this looks like graphically, and svn command-line examples of how the repository can be put into the state for that case. In addition, each case may include SVN Log entries that correspond to the state.

Overview

The project view displays the trunk, branches, and tags in a project. It also shows each change of state (rendered as dots, each of which represents a revision) as well as performance indicators (optionally associated with tags). The view has two scaling modes: temporal and sequential. In sequential mode, the left-to-right increments correspond to changes in state. In temporal mode, the left-to-right increments correspond to steps in time. Both modes show both types of changes, i.e. sequential changes to state and order of changes over time.

The per-asset view displays a revision history and asset contents. The revision history is a line with dots. Each dot represents a change of state to the asset (a revision point). For a given location, there is one and only one timeline. Each timeline may be rendered in one of two modes: show all and location only. In show all mode, every revision is show for the asset, even if the revision happened to the asset before it was copied to the viewed location. In location only mode, display is limited to revisions made when the asset was in the viewed location.

There are two types of assets: containers and non-containers. Files are examples of non-container assets, for example a spreadsheet or a text document. Directories are examples of container assets.

Overview—Constructs
revision head tag with
indicators
working copy
indicators
asset
copy
branch Each line represents a branch. The trunk and each branch contain a hierarchy of assets; each trunk/branch line is a handle to the asset hierarchy.

change set The list of changes at a specific revision. The list contains the path of each item that was modified (e.g. svn+ssh://host/repo/dir/file.txt) as well as an indication of what kind of change was made (e.g. added, removed, modified). Also referred to as changed paths.

commit point Each commit point represents a change of state to one or more assets at that point in time. The enumeration of changes is called a change set.

head The latest state of an asset or set of assets. The block at the end of each trunk/branch is a handle for the head of that trunk/branch. Selecting this handle is equivalent to "give me the latest stuff", which is not necessarily the same as saying "give me the latest revision".

performance indicators Each tag may have one or more performance indicators associated with it. Each block is a single metric. Each metric may have one or more asset groups associated with it. The colors in the blocks correspond to the metric score. Arrows in the block indicate whether the score has gone up or down since the previous tag with that metric. Grey blocks in the blocks indicate a change to the preference curves used to generate the metric score.

revision A specific state in the repository.

tag Each tag is a hierarchy of assets. Once created, tags are typically read-only.

working copy indicator The working copy indicator is a handle to a working copy. It provides a link to the working copy or a link to status about the differences between a working copy and the branch/trunk/tag from which it was checked out.

Overview—Status Indicators

The working copy status indicates the status of items on the file system relative to items in the repository. The status indicators include:
  marked for addition
  marked for removal
  has conflicts
  has changes
  contains items that have changes
  no changes The repository status indicates the status of items in the repository relative to the items on the file system. The status indicators include:
  has changes
  contains items that have changes
  no changes Project View Cases The cases enumerated below are organized into groups: one for asset copies, one for branches, and one for tags.

Asset Copy—from One Branch to Another

Copy one or more assets from one branch to another. This operation may replace or add to the assets in the destination branch.

```
svn copy REPO/PROJECT/trunk/dir/ REPO/PROJECT/branches/b1/dir
svn copy REPO/PROJECT/trunk/asset REPO/PROJECT/branches/b1
log goes here
```

Asset Copy—from One Branch to Itself

Copy one or more assets from one commit point on a branch to itself. This is equivalent to restoring one or more assets to a previous state, or reorganizing assets within a branch.

```
svn copy REPO/PROJECT/branches/b1/dir/@3
REPO/PROJECT/branches/b1/dir
svn copy REPO/PROJECT/branches/b1/asset@3
```

```
REPO/PROJECT/branches/b1
svn copy REPO/PROJECT/branches/b1/asset@3
REPO/PROJECT/branches/b1/dir
log goes here
```

Asset Copy—from External Source

Copy one or more assets from a source outside of a project onto a branch within a project.

```
svn copy REPO/PROJECTA/trunk/dir/ REPO/PROJECTB/branches/b1/dir
svn copy REPO/PROJECTA/trunk/asset REPO/PROJECTB/branches/b1
log goes here
```

Asset Copy—Mixed Sources

Copy one or more assets from both internal and external sources.

```
not possible from command line
log goes here
```

Branch Create—Copy from Source within Project

Create a branch by copying one or more assets from a location within the project.

```
svn copy REPO/PROJECT/trunk/ REPO/PROJECT/branches/b1
svn copy REPO/PROJECT/branches/b1/ REPO/PROJECT/branches/b2
log goes here
```

Branch Create—Copy from Source Outside Project

Create a branch by copying one or more assets from a location outside a project.

```
svn copy REPO/PROJECTA/trunk/ REPO/PROJECTB/branches/b1
svn copy REPO/PROJECTA/branches/b1/ REPO/PROJECTB/branches/b2
log goes here
```

Branch Create—Copy from Multiple Sources

Create a branch by copying one or more assets from a location outside a project as well as one or more assets from a location within a project.

```
cannot be done via command line
log goes here
```

Branch Create—Create Multiple Branches

Create more than one branch in a single operation.

```
cannot be done via command line
log goes here
```

Branch Create—Create Branch by Making a New Directory

Create a branch by creating a new directory.

```
svn mkdir REPO/PROJECT/branches/b1
log goes here
```

Branch Delete
Delete a branch.

```
svn rmdir REPO/PROJECT/branches/b1
log goes here
```

Branch Unknown
A branch may have no history associated with it, but does have commits. The branch origin is unknown.
Branch Restore
Restoration of a branch is accomplished by a delete then a create. This is not a new configuration, but rather a composition of two others (delete and create). Here are some examples of what restoration of a branch looks like.
Branch Replace
Replacing a branch is the same thing as either an asset copy (when some or all branch contents are replaced) or a delete-create (when a branch is deleted then replaced by a new branch with the same name).
Tag with Commit
Normally a tag is associated with a commit point and a branch.

```
svn copy REPO/PROJECT/trunk/@3 REPO/PROJECT/tags/tag
log goes here
```

Tag without Commit
A tag may be associated with a branch but not be associated with a specific commit point.

```
svn copy REPO/PROJECT/trunk/ REPO/PROJECT/tags/tag
log goes here
```

Dangling Tag
A tag may be created by copying assets from outside a project.

```
svn copy REPO/PROJECTA/trunk/ REPO/PROJECTB/tags/tag
log goes here
```

Tag Delete
A tag may be deleted. A deleted tag is rendered as a ghosted tag.

```
svn delete REPO/PROJECT/tags/tag
log goes here
```

Multiple Tags at Same Commit
There may be more than one tag associated with a single commit point. This can happen either by overwriting a tag or by delete-then-new tag. In these cases, only the latest tag is displayed.

```
svn copy REPO/PROJECT/trunk/ REPO/PROJECT/tags/taga
svn copy REPO/PROJECT/trunk/ REPO/PROJECT/tags/tagb
svn delete REPO/PROJECT/tags/tag
svn copy REPO/PROJECT/trunk/ REPO/PROJECT/tags/tag
log goes here
```

Asset Timeline Cases
Asset
Asset Deleted
The asset was deleted and is no longer contained in the head.
Asset Deleted then Restored
The asset was deleted then restored.

What is claimed is:

1. Computer apparatus for managing engineered product revisions, comprising:
    a repository holding one or more assets, for each asset the repository holding respective revisions of the asset, different assets forming different engineering products and having respective contents; and
    a revision manager tracking changes of state made to assets of the repository, each change of state made to a given asset resulting in a respective revision of the given asset, the revision manager enabling users to manage assets and revisions by providing to users a repository view illustrating for a subject asset that is a container (i) a timeline sequence of changes of state of the subject asset, and (ii) the contents of the subject asset, the revision manager rendering the timeline sequence in the repository view in user selectable modes including a show all mode and a location only mode, the location only mode illustrating revisions made to the subject asset up to a viewed location of the repository.

2. The computer apparatus of claim 1, wherein the timeline sequence includes a series of indications, one indication for each revision, ordered from an oldest revision to a most recent revision.

3. The computer apparatus of claim 2, wherein the repository view further includes:
    revision number indicators corresponding to respective changes of state of the subject asset.

4. The computer apparatus as claimed in claim 2 wherein the timeline sequence includes a head element representing a current state of the subject asset.

5. The computer apparatus as claimed in claim 3, wherein the timeline sequence enables user navigation to the different revisions of the subject asset as held in the repository.

6. The computer apparatus as claimed in claim 1, wherein the revision manager is further configured to provide to users a repository view illustrating for a subject asset that is a non-container (i) a timeline sequence of changes of state of the subject asset that is a non-container, and (ii) the contents of the subject asset that is a non-container.

7. The computer apparatus as claimed in claim 1, wherein the repository view illustrates the contents of the subject asset by a hierarchy of icons and descriptors.

8. A computer implemented method for managing engineering product revisions comprising the steps of:
    holding one or more assets in a repository, for each asset, holding respective revisions of the asset in the repository, different assets forming different engineering products and having respective contents;

tracking changes of state made to assets of the repository, each change of state made to a given asset resulting in a respective revision of the given asset;

generating a repository view illustrating for a subject asset that is a container (i) a timeline sequence of changes of state of the subject asset and, (ii) the contents of the subject asset, the repository view allowing users to navigate to assets and revisions in the repository; and rendering the timeline sequence in the repository view in user selectable modes, including a show all mode and a location only mode, the location only mode illustrating revisions made to the subject asset up to a viewed location of the repository.

9. A method as claimed in claim 8 wherein the timeline sequence includes a series of indications, one indication for each revision, ordered from an oldest revision to a most recent revision.

10. A method as claimed in claim 9 wherein the repository view further includes:

revision indicators corresponding to respective changes of state of the subject asset.

11. A method as claimed in claim 9 wherein the timeline sequence includes a head element representing a current state of the subject asset.

12. A method as claimed in claim 10, further including generating a repository view illustrating for a subject asset that is a non-container (i) a timeline sequence of changes of state of the subject asset and, (ii) the contents of the subject asset, the repository view allowing users to navigate to assets and revisions in the repository.

13. A method as claimed in claim 8 wherein the repository view illustrates the contents of the subject asset by a hierarchy of icons and descriptors.

14. An engineering product revision management system comprising:

computer repository means for holding one or more assets, for each asset the repository means holding respective revisions of the asset, different assets forming different engineering products and having respective contents;

processor means for tracking changes of state of assets of the repository means, each change of state of an asset resulting in a respective revision of the asset; and repository viewing means for illustrating to users through a computer system for a subject asset that is a container (i) a revision history of the subject asset and (ii) the contents of the subject asset, the revision history being a timeline sequence of changes in state of the subject asset and the revision history enabling users to effectively navigate among assets and revisions in the repository means, and for rendering the timeline sequence in the repository view in user selectable modes, including a show all mode and a location only mode, the location only mode illustrating revisions made to the subject asset up to a viewed location of the repository.

15. A system as claimed in claim 14 wherein the timeline sequence is from an oldest revision to a most recent revision of the subject asset.

16. A system as claimed in claim 14 wherein the repository viewing means is further for illustrating to users through a computer system for a subject asset that is a non-container (i) a revision history of the subject asset and (ii) the contents of the subject asset, the revision history being a timeline sequence of changes in state of the subject asset and the revision history enabling users to effectively navigate among assets and revisions in the repository means.

17. A computer program product comprising:

a computer readable storage medium having a computer readable program, wherein the computer readable program when executed on a computer causes a computer to:

hold one or more assets in a repository, including for each asset holding respective revisions of the asset in the repository, different assets forming different engineering products and having respective contents;

track state changes of assets of the repository, each state change of a given asset resulting in a respective revision of the given asset;

generate a repository view illustrating to users, for a subject asset that is a container, (i) a revision history of the subject asset and (ii) the contents of the subject asset, the revision history including a time line sequence of changes in state of the subject asset, the timeline sequence assisting user navigation of the repository; and render the timeline sequence in the repository view in user selectable modes, including a show all mode and a location only mode, the location only mode illustrating revisions made to the subject asset up to a viewed location of the repository.

* * * * *